United States Patent [19]

Monen et al.

[11] Patent Number: 4,587,643
[45] Date of Patent: May 6, 1986

[54] DISC PLAYBACK APPARATUS

[75] Inventors: Marinus J. B. M. Monen, Colorado Springs, Colo.; Shunsuke Furukawa, Tokyo; Tsuneo Furuya, Kanagawa, both of Japan

[73] Assignee: Sony Corporation, Tokyo, Japan

[21] Appl. No.: 644,264

[22] Filed: Aug. 27, 1984

[30] Foreign Application Priority Data

Sep. 1, 1983 [JP] Japan .................. 58-161515

[51] Int. Cl.$^4$ .................................. G11B 21/10
[52] U.S. Cl. ...................... 369/32; 358/907; 369/44; 369/59
[58] Field of Search ............... 358/342, 907; 360/10.1, 360/11.1, 19.1, 32, 38.1, 36.2, 10.2, 10.3; 369/30, 32, 33, 48, 49, 50, 59, 43, 44, 111

[56] References Cited

U.S. PATENT DOCUMENTS

| | | | |
|---|---|---|---|
| 4,224,642 | 9/1980 | Mawatari et al. | 360/32 |
| 4,309,721 | 1/1982 | Christopher | 358/342 |
| 4,313,134 | 1/1982 | Rustman et al. | 358/342 |
| 4,361,849 | 11/1982 | Bolger | 358/342 |
| 4,477,842 | 10/1984 | Kaneko | 369/59 |
| 4,488,278 | 12/1984 | Dieterich | 369/59 |
| 4,516,164 | 5/1985 | Moxon | 369/59 |

Primary Examiner—Donald McElheny, Jr.
Attorney, Agent, or Firm—Lewis H. Eslinger; Alvin Sinderbrand

[57] ABSTRACT

Apparatus permits the use of a known optical compact audio disc for providing a larger memory capacity so that data other than audio data can be reproduced therefrom while maintaining consistency with respect to signal format and signal processing, such as error correcting methods and recording data formats and the like, by providing write clock signals and read-out clock signals for reading into and out two memories the main digital data signal by using a subdigital data signal that is recorded on the disc along with the main digital data and which is reproduced from the disc at the same time as the main data in order to provide addressing of the main digital data on a more accurate level and with finer resolution, and a control system searches a playback location of the main digital data based upon the subdigital data as read out from the buffer memory, in which subdigital data has been written by the write clock signal.

19 Claims, 10 Drawing Figures

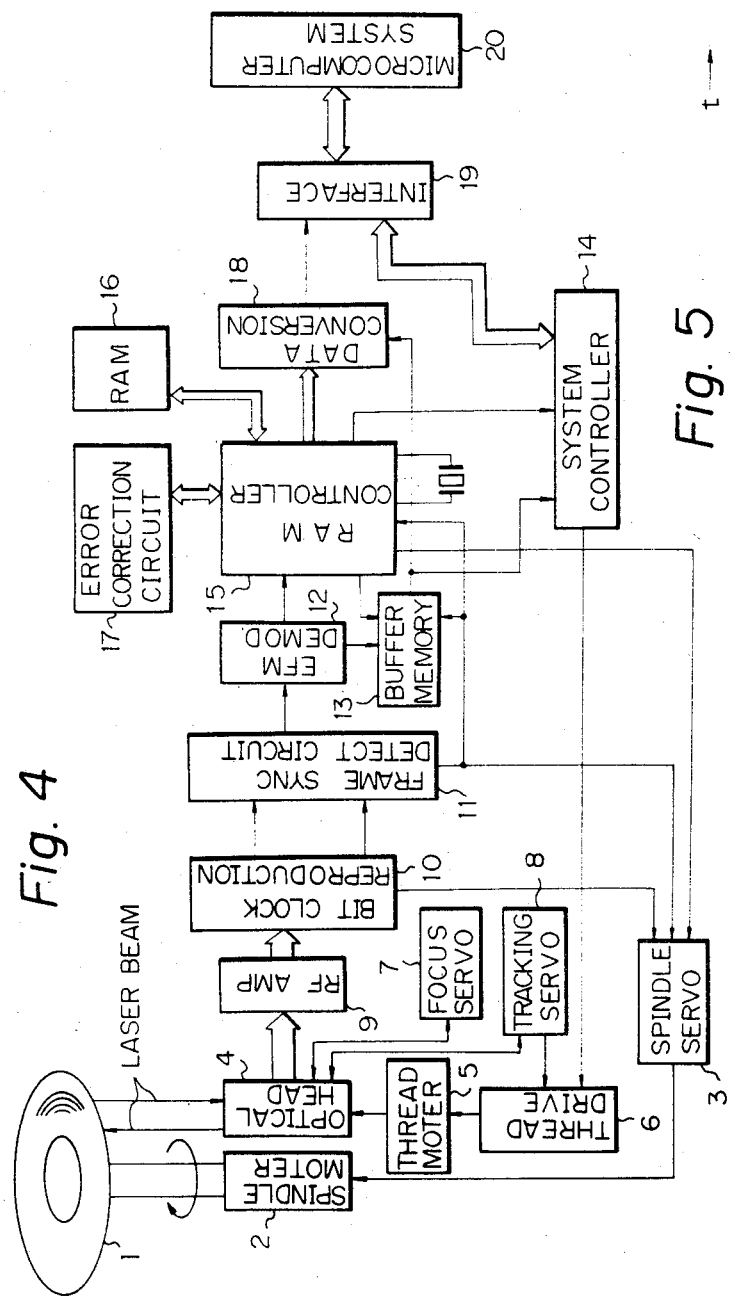

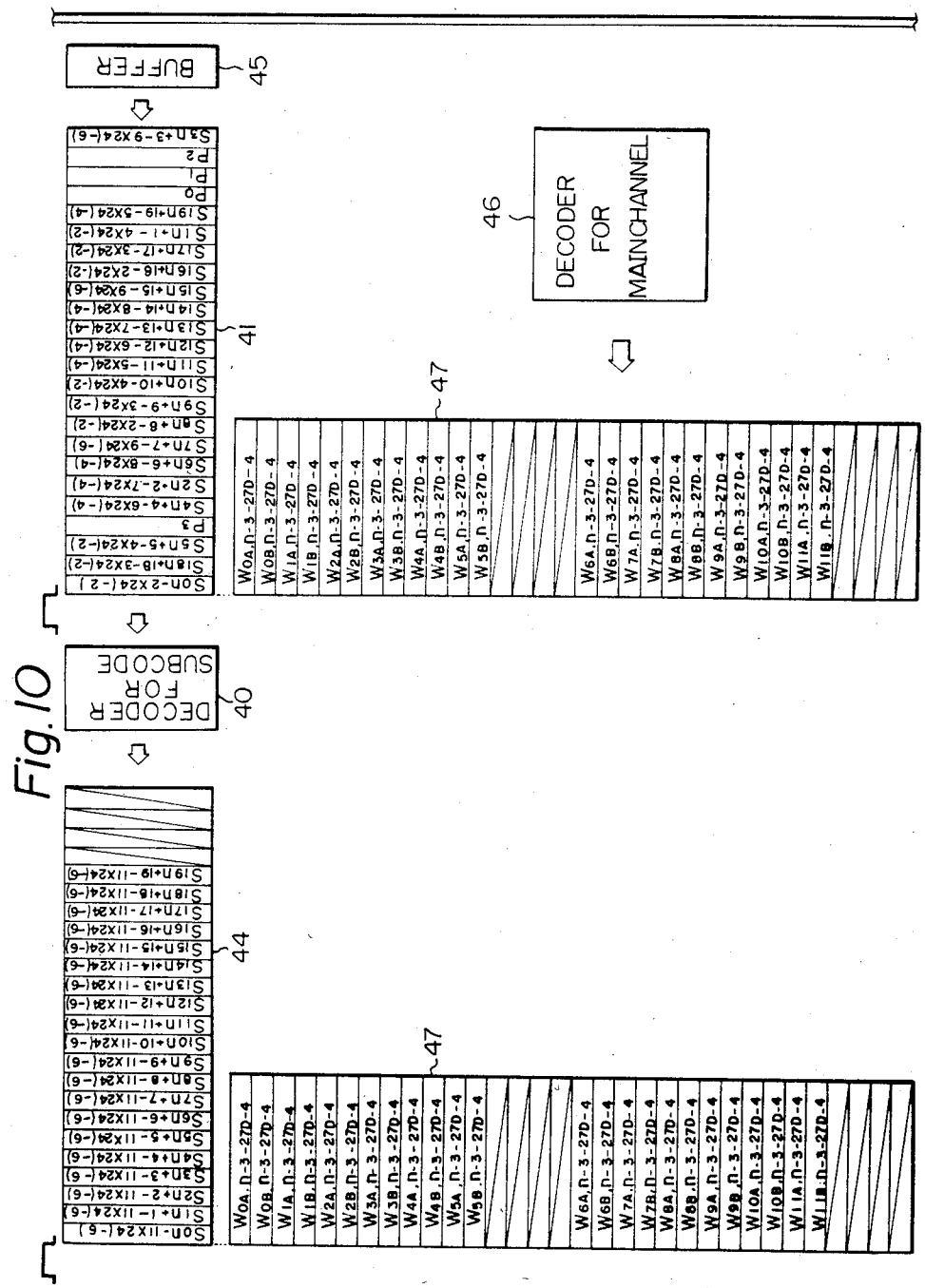

DISC PLAYBACK APPARATUS

BACKGROUND OF THE INVENTION

1. Field the Invention

This invention relates generally to digital disc playback apparatus for use with a digital disc on which two-channel digital audio signals are recorded and, more specifically, to digital disc playback apparatus in which digital data other then audio signals are recorded and utilized upon playback.

2. Description of the Prior Art

The system employing an optically encoded digital audio disc, which has become known as a compact audio disc or a digital audio disc, is known to reproduce high quality stereophonic musical signals. In such systems, the data is recorded by a laser as pits in the surface of the disc and then the information encoded in the pits is read out by another laser device in the playback system. At present only audio information has been encoded on such discs, however, it is apparent that if information or data representing characters, display data, program data, and data other than conventional stereophonic audio signals could be reproduced by such optical digital audio disc system, without extensive modifications to the existing player, a large range of applications would be possible for the compact digital disc system. For example, some desired uses might involve playback apparatus to reproduce visual information such as charts, statistics, graphs, and the like, as well as pictural illustrations, still pictures, or video games, by adding only a suitable display unit to the playback apparatus. This would then provide a wide range of applications for the compact digital disc system.

Nevertheless, while these uses for the compact digital disc system other than audio signals might be obtained by a flexible magnetic disc or "floppy" disc formed on relatively thin plastic base material, the data memory capacity currently provided in the compact audio disc is around 500 megabytes and this is much greater than the memory available on the standard flexible disc.

On the other hand, because compact audio discs have been developed and utilized principally for the reproduction of audio signals, the search capability is relatively coarse, since the informational units are relatively large musical program segments. That is, the data on the disc is searched on a relatively large scale basis since the musical program segments represent large informational units. This is in conflict, however, with requirements relative to data uses other than audio, since these other data uses involve data segments that must be read out and identified on a much smaller unit basis, for example, on the order of 128 bytes to 10 kilobytes. This presents a distinct problem in attempting to use the compact digital disc system for purposes other than the recordation and replaying of high quality stereophonic audio signals.

Additionally, in the case of musical signals the degree of accuracy required for searching for the beginning of a music program may be kept within such a low range that no problem will be caused in terms of the reproduced audio signal if the search yields somewhat erroneous results. Therefore, the audio data in the main channel which was separated from the signal reproduced from the compact disc can be written once into a buffer memory and then be subjected to error correction processing and, at the same time, variations in the time base in the data can be eliminated. Nevertheless, the time base variation of a subcoding signal was not eliminated to reduce the costs of manufacturing, because fine or accurate searching is not required. Consequently, if it is attempted to utilize the compact digital disc playback apparatus as a data memory, the problem is presented such that it is impossible to correctly specify, with any accuracy, the read address by use of the subcoding signal.

OBJECTS AND SUMMARY OF THE INVENTION

Accordingly, it is an object of the present invention to provide a disc playback system for playing back digital data other than audio signals, which can eliminate the above-noted defects inherent in the prior art.

Another object of the present invention is provide a compact digital disc playback apparatus that can read out digital signals of program data or the like in place of digital audio signals utilizing a compact disc of the kind used for standard digital audio playback.

In accordance with an aspect of the present invention, a disc playback system is provided that employs a write clock generator that generates a write clock signal that is synchronized with a signal reproduced from the compact disc and also a read-out clock generator that generates a clock signal having a fixed period. A buffer memory is provided in which the main digital data signal reproduced from the disc is written by the use of the write clock signal and from which the main digital data signal having been written therein is read out by use of the read-out clock signal. A second buffer memory is provided in which the subdigital data reproduced from the disc is written by use of the write clock signal and from which the subdigital data written therein is read out by means of the read-out clock signal. The present invention further provides a control system that searches a playback location in the main digital data by using the subdigital data that has been read out from the second buffer memory.

The above, and other objects, features, and advantages of the present invention will become apparent from the following detailed description of illustrative embodiments thereof to be read on conjunction with the accompanying drawings.

BRIEF DESCRIPTION OF THE DRAWINGS

FIG. 4 is a block diagram of one embodiment of digital disc playback apparatus according to the present invention;

FIG. 5 is a schematic representation of a word format of the serial data according to one embodiment of this invention;

FIG. 10 is a schematic representation showing the timing relationships and contents of the subcoding signal and the data in the main channel with respect to the reproducing processing according to the present invention.

DESCRIPTION OF PREFERRED EMBODIMENTS

Figure 1:
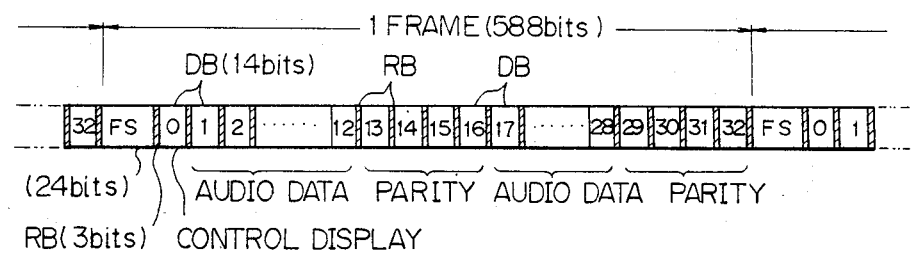
FIG. 1 is a schematic representation of the data arrangement of recording data on a compact disc to which the present invention is applied.
Figure 2:
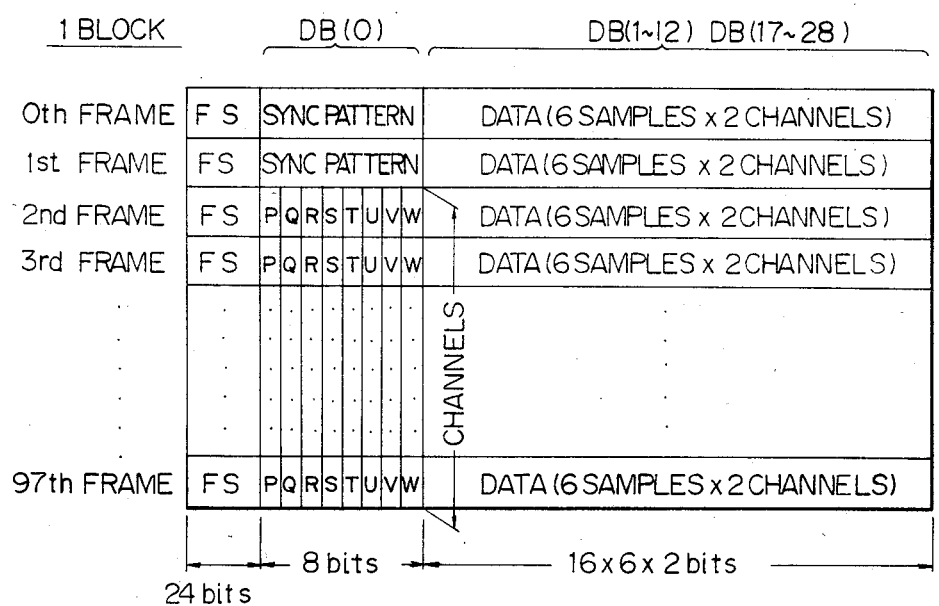
FIG. 2 is a schematic representation of the data of FIG. 1 having been rearranged in a parallel fashion.

The present invention is directed to a compact disc of the kind typically employed to record stereophonic audio signals, and FIGS. 1 and 2 show the data arrangement of the signals to be recorded on a compact disc. More specifically, in FIG. 1, a data stream as recorded on a compact disc is represented consisting of 588 bits of record data with each FRAME having at its head or beginning a frame sync pulse group FS having a specific bit pattern. After the frame sync pulses FS are arranged 3-bits of DC restoration bits RB. Following the initial 3-bit DC restoration bits RB there are arranged the 0th to 32nd data bit groups DB, each comprising 14 bits per group, with the 3-bit DC restoration bits RB being alternately recorded so that the data bits DB are arranged therebetween. The 0th bits among these data bits DB are called the subcoding signal or user bits and are used to control the playback of the disc and to display information relating thereto, such as the program segment number of the like. Thereafter, the 1st–12th and 17th–28th data bit groups DB are provided for audio data in the main channel. The remaining 13th–16th and 29th–32nd data bit groups DB are assigned as parity bits utilized in the error correction coding in the main channel. Each of the data bit groups DB consists of 14 bits, which have been derived by converting the 8-bit data into 14 bits utilizing the known 8-14 conversion process during recording.

Referring now to FIG. 2, one BLOCK is shown consisting of 98 FRAMES that are arranged sequentially in parallel, wherein each of the data bit groups DB is represented by 8 bits and the DC restriction bits are excluded. In the 0th and 1st frames the subcoding signals P-W in the 0th data group DB form sync patterns having predetermined bit arrangements. More specifically, in the Q channel, the cyclic recirculating code (CRC) for error detection and correction is inserted in the last 16 FRAMEs of the 98 FRAMEs making up the BLOCK shown in FIG. 2.

The P channel contains a signal that is a flag to indicate a music program and to indicate a pause, and this signal has a lower level during the extent of a musical program and a higher level during the extent of a pause. The P channel signal also contains a 2-Hz period during the lead out from a music program segment. It is possible to select and playback a specified musical program by detecting and counting this signal in the P channel. Similarly, the Q channel enables a more complicated and sophisticated control of this kind, for example, when the Q-channel information is stored in a microcomputer provided in the disc playback apparatus, it is possible to shift quickly from one musical program to another during the playback of a music program. Thus, respective ones of the recorded musical programs may be selected and played back at random, that is, out of the order at which they appear on the disc. The other channels R through W can be used to indicate or explain by audible vocal sounds information concerning the author or composer or to recite poetry or the like relative to the musical programs recorded on the disc.

Among the 98 bits in the Q channel of one BLOCK, the first two bits are used to provide a sync pattern as discussed above and the subsequent four bits are used as address bits. Following the address bits the 72 bits are used as data bits and finally the CRC code having 6 bits is added at the end for error detection and correction. A track number code TNR and an index code X are included in the 72 bits representing the data bits and the index code and the track number code can be represented by two decimal codes that can vary from 00 to 99. Additionally, also included in the Q channel data is a time indication code representing the duration of the various music programs and of the pauses, and a time indication code indicating the absolute time duration or elapsed time that continuously changes from the beginning to the end of the compact disc. It should be noted that in the compact disc the beginning of the program material is at the inner most radius and the end of the program material is at the outer most radius, a situation contrary to conventional phonograph records. These time indication codes comprise the codes indicating the minute, second, and FRAME, each consisting of two decimals, providing information concerning the data on the digital disc. According to this system, one second is divided into 75 FRAMEs to form the time scale and, in order to access the compact disc to obtain digital data on a shorter unit basis than the music segments, the time indication code with respect to the above-described absolute time duration is used, that is, the time code that indicates elapsed time on the disc.

Figure 3:
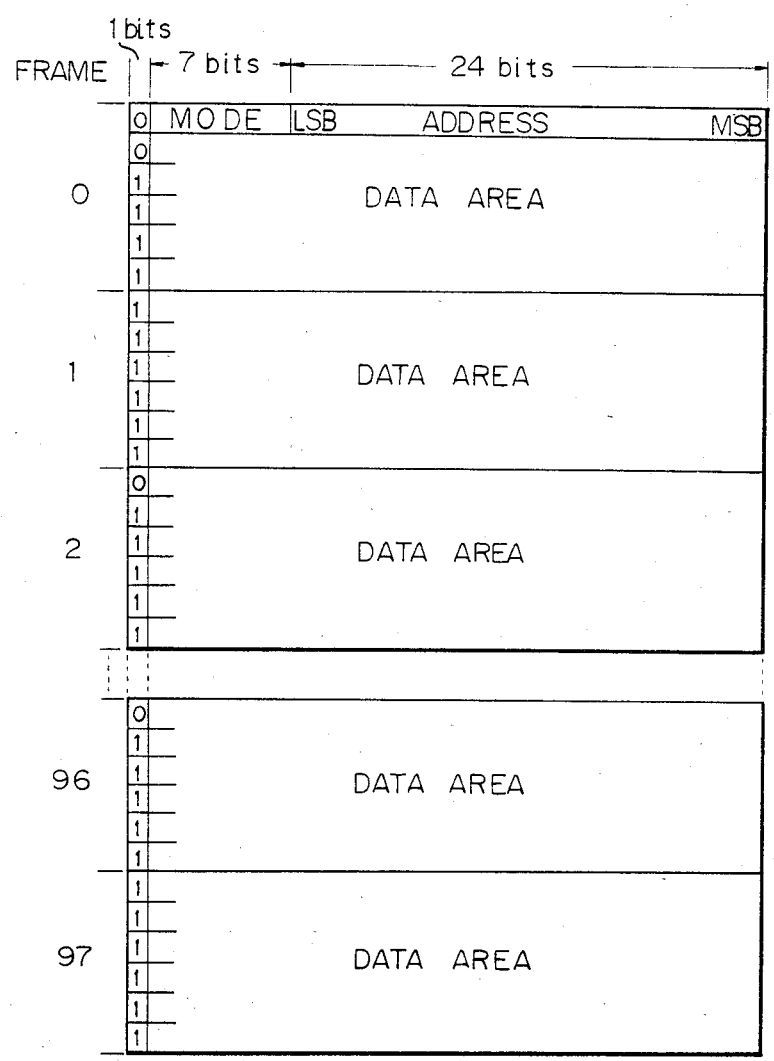
FIG. 3 is a schematic representation showing the arrangement of one BLOCK upon recording the digital data in an embodiment according to the present invention.

According to the above description, it is seen that a minimum unit of change of the subcoding signal for the compact digital disc is 98 FRAMEs. In this embodiment, when recording digital signals other than stereophonic musical signals, which digital signals are shown for example in FIG. 3, one BLOCK is formed having a length of 98 FRAMEs corresponding to the 0th to 97th FRAMEs of FIG. 3. As pointed out hereinabove, one FRAME includes digital audio data consisting of 12 words, so that 24-bit digital data can be inserted in one FRAME. Note the 12 words are from the 1st–12th and 17th–28th data bit groups DB. Turning then to FIG. 3, one ROW contains a total of 32 bits of one sample in the left channel (L) of the audio data and 32 bits of one sample in the right channel (R) thereof, and each FRAME consists of 6 such ROWs. This is represented also in FIG. 2 in the data portions DB(1-32), which is formed of six samples that is six ROWs, of 32 bits for each of the left and right channels.

A 1-bit sync bit is placed at the beginning of each 32 bit ROW and in the 0th FRAME the first two ROWs are begun with a 0 value in the sync bit position. According to the present invention, the sync bits appearing at the first bit position of the first ROW of all of the even-numbered frames have a "0" value, whereas the sync bits commencing the first 32 bits in all frames odd-numbered have a "1" value. These sync bits enable the detection of the head location of the block on a 98

FRAME unit basis because of the two successive "0" bits in the first and second ROWs of the first FRAME of the BLOCK.

According to the present invention, the above-described BLOCK consist of 2352 bytes (24 bytes×98 FRAMES) and so when the data of two kilobytes (2048 bytes) is inserted in one BLOCK, then 304 bytes (2432 bits) will remain. There are then provided the remaining 588 bits (6×98) that are used as sync bits, and a 7-bit mode signal and a 24-bit address signal are inserted in the first 32 bits in the 0th FRAME. Thus, 1813 bits still remain in one BLOCK according to the present invention, and these 1813 bits can be assigned to redundant bits when the error correction coding processing is performed for the data of one BLOCK.

The 7-bit mode signal in FIG. 3 serves to specify the kind of data contained within each BLOCK, for example, the mode signal can be used to discriminate character data, still picture data, and program code information, and the 24-bit address signals serve to specify the data in that BLOCK. Furthermore, by setting the sync bits of even-numbered FRAMEs to "0" the present invention provides an arrangement of a data BLOCK on a 2-FRAME unit basis. Thus, for the BLOCK having a size of two FRAMEs, a mode signal and an address signal are added to each BLOCK. In the case of a BLOCK having a length of 98 FRAMES, as discussed hereinabove, the codes for indicating the absolute time durations of the P data and the Q data of the subcoding signals in the same BLOCK are identical.

Accordingly, digital signals in the format shown in FIG. 3 can be recorded on a compact disc in the same fashion as on an audio compact disc, that is, a digital signal to be recorded is fed to a digital input terminal of a digital audio processor and this digital signal is converted into a video signal format. Such video signal format digital signal is then recorded using a video tape recorder (VTR) of the conventional rotary head kind. In this case, table of contents (TOC) data used to generate a subcoding signal is preliminarily recorded in the audio track on the starting edge section on a magnetic tape on which the above-described digital signal is to be recorded. The table of contents data reproduced from the magnetic tape is then supplied to a subcoding generator, and the reproduced digital signal is fed to an encoder and the subcoding signal is also supplied to the encoder. A laser beam is then modulated in response to the output signal of the encoder, and a master compact disc is formed by this modulated laser beam.

Another method of recording a digital signal could also be followed in which a hard-disc memory, which can be accessed at high speed, is accessed by a minicomputer and a digital signal is then fed in real time to an encoder of the compact audio disc cutting system.

When recording the digital signal, because the time indication codes, which consist of each column representing minute, second and FRAME, that are included in the Q channel of the subcoding signal are used as addresses, the corresponding relationships between such addresses and the digital signals must be determined. More specifically, because the digital signal in the main channel is recorded on the master disc through the use of an encoder for the CRC codes, which consists of the combination of two interleave series and the Reed-Solomon code, the recording position on the disc of one data BLOCK, consisting of data of 98 FRAMES, as represented in FIG. 3, then locates a predetermined position. On the other hand, the time indication code signals included in the Q channel of the subcoding signal is a continuous coding signal such that the column of the FRAMEs will change on a 98-FRAME unit basis in the track on the disc, and when the column totals 75 FRAMEs, the number in the seconds column will change and, accordingly, when this number in the seconds column reaches 60 seconds, the minutes column will change. As described above, the continuous time indication code changes continuously from the first section in the program area of the disc to the end of the lead-out track of the program area and, consequently, it can be used as an address for the digital signal to be recorded in the predetermined location.

FIG. 4 represents one embodiment of the present invention in which a compact disc 1 has a digital signal of the above-described format recorded thereon in a spiral record track. Compact disc 1 is rotated by spindle motor 2 that is controlled by spindle servo circuit 3, so that compact disc 1 rotates at a constant linear velocity but with a varying angular velocity. Optical head 4 employs a laser source for generating a laser beam to pick up of the information from compact disc 1, and optical head 4 typically includes an objective lens and a photo receiving device for receiving the laser beam reflected from compact disc 1. Optical head 4 can be moved radially along compact disc 1 by a motor and threaded shaft 5, which comprises a lead screw that is rotated by the motor along which a threaded nut attached to the head 4 travels. Thread feed motor 5 is controlled and driven by thread drive circuit 6. Optical head 4 can be deflected both in the direction perpendicular to the signal surface, that is, the surface of compact disc 1, and also in the direction parallel thereto and is controlled so that the focusing and tracking operations by the laser beam upon playback are always properly performed. To accomplish such focussing and tracking, focus servo circuit 7 and tracking servo circuit 8 are provided.

The signal reproduced by optical head 4 is fed to RF amplifier 9, and optical head 4 is typically provided with a focus error detection section consisting of the combination of a cylindrical lens with a four-segment detector and a tracking error detection section employing three laser spots. The output data signals of RF amplifier 9 are fed to clock extraction circuit 10 that provides outputs on two separate lines representing the data with the clock signal extracted therefrom and the clock signal, and these signals are fed to frame sync detection circuit 11.

In this embodiment, the digital signal recorded on compact disc 1 has been modulated according to the EFM system, EFM being a known method of block converting 8-bit data into data of a greater number of bits, preferably 14 bits, and in this case 14 bits provide a long minimum inverting time period of the modulated signal in order to reduce low frequency components. Accordingly, digital demodulator 12 is arranged to provide EFM demodulation of the reproduced signal. The bit clock signal which is extracted by clock extraction circuit 10 and the frame sync signal that is detected by frame sync detection circuit 11 are fed to the spindle servo circuit 3.

The subcoding signal is separated by the digital demodulator 12 and this separated subcoding signal is fed through buffer memory 13 to system controller 14, which is equipped with a central processing unit (CPU), not shown. The rotation operation of compact disc 1, the thread feeding operation and the reading operation of the optical disc 4, and other similar system operations are controlled by system controller 14. Control commands are supplied to system controller 14 through interface unit 19, which is of the conventional kind, and the reading operation of the desired digital signal from compact disc 1 using the subcoding signal is controlled by system controller 14.

The main digital data output from digital demodulator 12 is supplied to random access memory (RAM) controller 15, to random access memory (RAM) 16, and to error correction circuit 17. Signal processing necessary to eliminate variations in the time base of the data and error correction and error interpolation are carried out in RAM controller 15, RAM 16, and error correction circuit 17, so that corrected main digital data is provided at the outputs of RAM controller 15. In the system in which audio information has been recorded on compact disc 1, during playback digital-to-analog converters would be connected to the outputs of RAM controller 15, however, in the embodiment of FIG. 4 no digital-to-analog converter is necessary, because the signal is already in digital form at the outputs of RAM controller 15. This reproduced digital data signal is fed directly to data conversion unit 18, which may comprise a parallel-to-serial converter. Also, the reproduced subcoding signal supplied from buffer memory 13 is fed to data conversion unit 18, and the reproduced data is converted into serial form therein. This reproduced serial data signal is fed to interface unit 19, and the data for system controller 14 is supplied from microcomputer system 20 through interface unit 19 to system controller 14. Microcomputer system 20 specifies a read-out address and applies drive control signals, such as start signals, in addition to the read-out addresses to interface 19 and system controller 14.

An example of the word format used in the serial output signal produced by data conversion unit 18 is shown in FIG. 5. In this serial signal, one word consists of 32 bits with the first four bits being used as a preamble, the next four bits being used as auxiliary bits for the audio data, and the next twenty bits being used for the actual digital audio sample. In the case where the digital audio sample consists of only sixteen bits, the sixteen bits are inserted starting at the end closer to the auxiliary bits, that is, at the least significant bit (LSB) position. Finally, following the 20 bits of the digital audio sample there are added four additional bits in which bit V is a flag indicating whether the digital audio sample of that word is effective or not, bit U is a bit of the subcoding signal, bit C is an identification bit used to identify the channel, and bit P is a parity bit. Bit U of the subcoding signal is inserted into each word format, 1 bit at a time, and these inserted bits are sequentially transmitted upon reproduction.

In one embodiment of the present invention, the time base variation of the subcoding signal is eliminated by buffer memory 13. This time base correction is the same as that executed by RAM controller 15 and RAM 16, with respect to the actual digital signal in the main channel. More specifically, RAM controller 15 produces a write clock signal synchronized with the reproduction signal from a detected frame sync signal and writes the digital data into RAM 16 by the use of this write clock. Thus, when the digital signal is read out from RAM 16 the read clock produced from an output of a quartz crystal oscillator 15a is utilized. The present invention teaches that these write clock and read clock signals are used to write and read out, respectively, the subcoding signal into and from buffer memory 13. Thus, the subcoded signal read out from buffer member 13 does not have time base variations, so that there are no changes in the timing relationship between the digital signal and the main channel and the subcoding signal that might be due to such time base variations.

According to an embodiment of the present invention, a read instruction to a predetermined address is first executed by microcomputer system 20 and this address is a code that indicates an absolute time duration in the Q channel and is supplied through interface unit 19 to system controller 14. Following this coded address signal, system controller 14 controls thread drive circuit 6 to move optical head 4 to the location near a desired pick-up location, while at the same time supervising or monitoring the subcoding signal being reproduced by optical head 4. In this example, reproduction is started from a location spaced a few BLOCKs away from the desired pick-up location to prevent the situation in which a malfunction in the access operation remains because an error was included in the reproduced subcoding signal and the set subcoding signal is not reproduced. The desired BLOCK is then obtained by either method of detecting the coincidence of the reproduced subcoding signal with the designated address or by starting the playback from a known location near the correct subcoding signal and then counting the frame sync signals.

Figure 6:
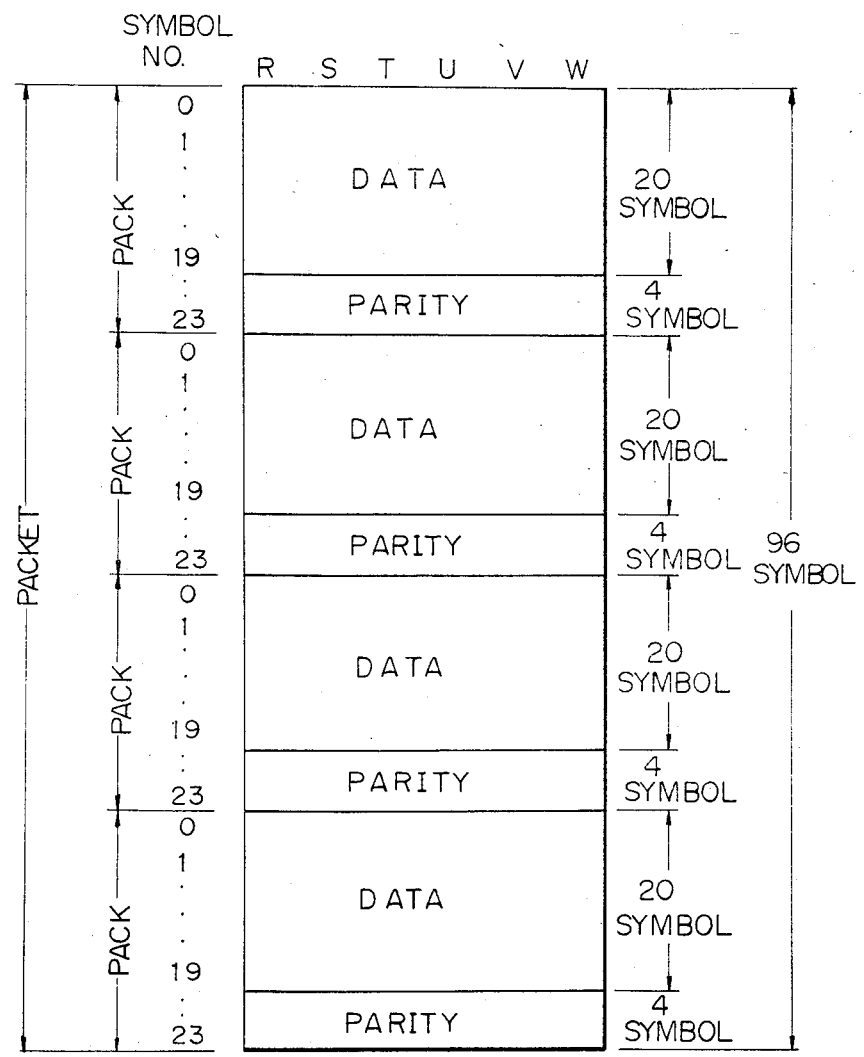
FIG. 6 is a schematic representation of the arrangement of the subcoding signal according to another embodiment of the present invention.

In another embodiment differing from the above, it may be possible to insert the address code signal at which the error correction code was coded in the R-W channels of the subcoding signals. In that regard, another embodiment of the invention is described hereinbelow in which the address code signal is inserted in the R-W channels of the subcoding signals. In such case, one PACKET consists of the 96-FRAME data excluding the sync pattern of the 0th and 1st FRAMEs and excluding the P and Q channels in the one BLOCK consisting of 98 FRAMEs as shown in FIG. 2. This embodiment is represented in FIG. 6, in which a PACKET of 6×96 bits is further divided into four PACKs, each having 24 SYMBOLs. Twenty SYMBOLs of each PACK are used for address data and the remaining four SYMBOLs are parity bits of the error correction code of each PACK. A Reed-Solomon code (24,20) is used as an error correction code for this pack of (6×24) bits. This Reed-Solomon code can be represented by a polynomial as follows $$P(X) = (X^6 + X + 1)$$

over the Galois field $GF(2^6)$.

This Reed-Solomon code including the four P-parity SYMBOLs can correct one SYMBOL error and two SYMBOL errors and can detect three or more SYMBOL errors.

Figure 7:
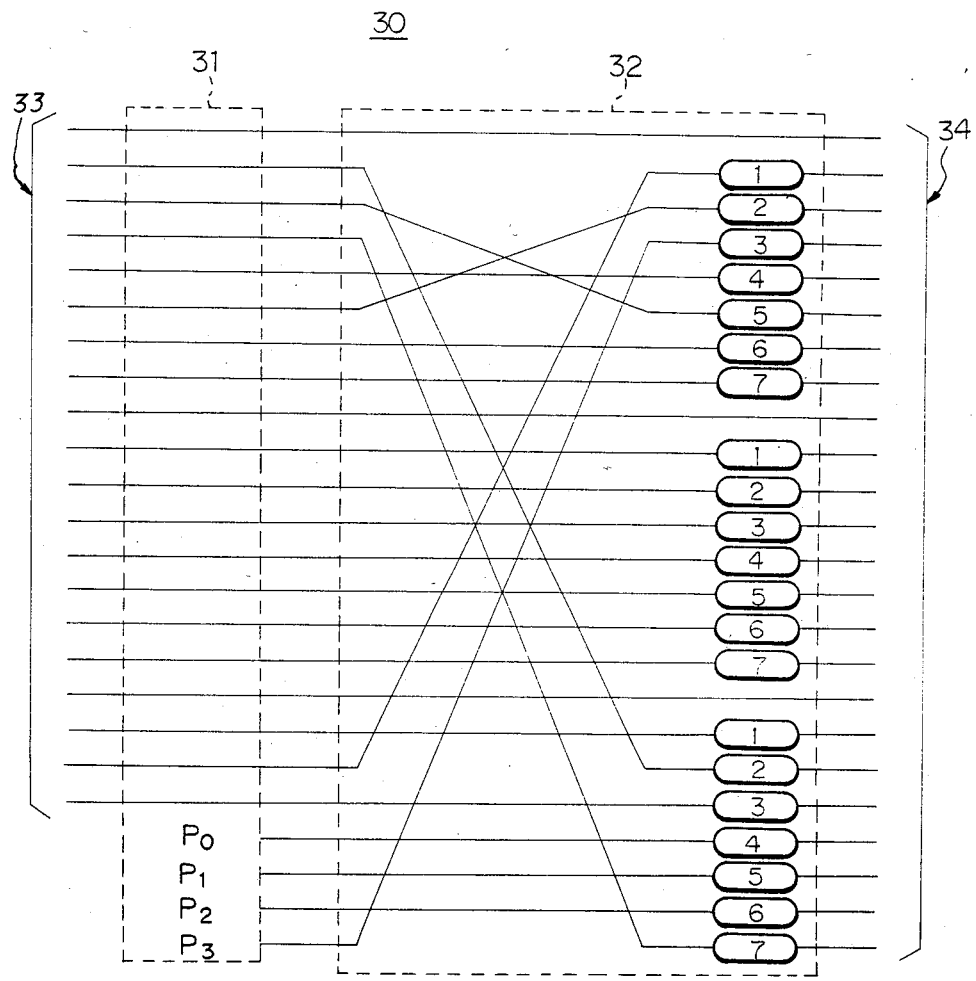
FIG. 7 is a block diagram showing an embodiment of an error correction encoder for the subcoding signal of the present invention.

An error correction encoder is represented at 30 in FIG. 7 with respect to the R-W channels as described above, and error correction encoder 30 employs a P-parity generator, represented by the broken line 31, of the previously mentioned (24,20) Reed-Solomon code, and also includes interleaving circuit 32. Twenty input symbols 33 in the same PACK are fed to P-parity generator 31 to generate four parity symbols $P_0, P_1, P_2$, and $P_3$. The 24 symbols to be output from P-parity generator 31 are supplied to interleaving circuit 32, which is constructed employing a random access memory (RAM) and including an address controller, and which generates the output data to which a predetermined delay time value has been added to each SYMBOL of input data by controlling the write addresses and the read addresses.

As shown in FIG. 7, in place of the actual RAM the means for adding the predetermined delay time value to each SYMBOL is represented by a plurality of delay elements, in order to simplify understanding of the interleaving circuit and to simplify the drawing thereof. There are three delay elements that provide a delay time of one PACK (24 SYMBOLs), three delay elements that provide a delay time of two PACKs, three delay elements that provide a delay time of three PACKs, three delay elements that provide a delay time of four PACKs, three delay elements that provide a delay time of five packs, three delay elements that provide a delay time of six PACKs, and three delay elements that provide a delay time of seven PACKs. The delay time value of the SYMBOL in which no delay element is seen to be inserted is thus set to zero. Accordingly, three combinations, each consisting of eight different kinds of delay time values, from zero to seven PACKs are provided. An output SYMBOL 34 of one PACK is generated from interleave circuit 32.

Figure 8:
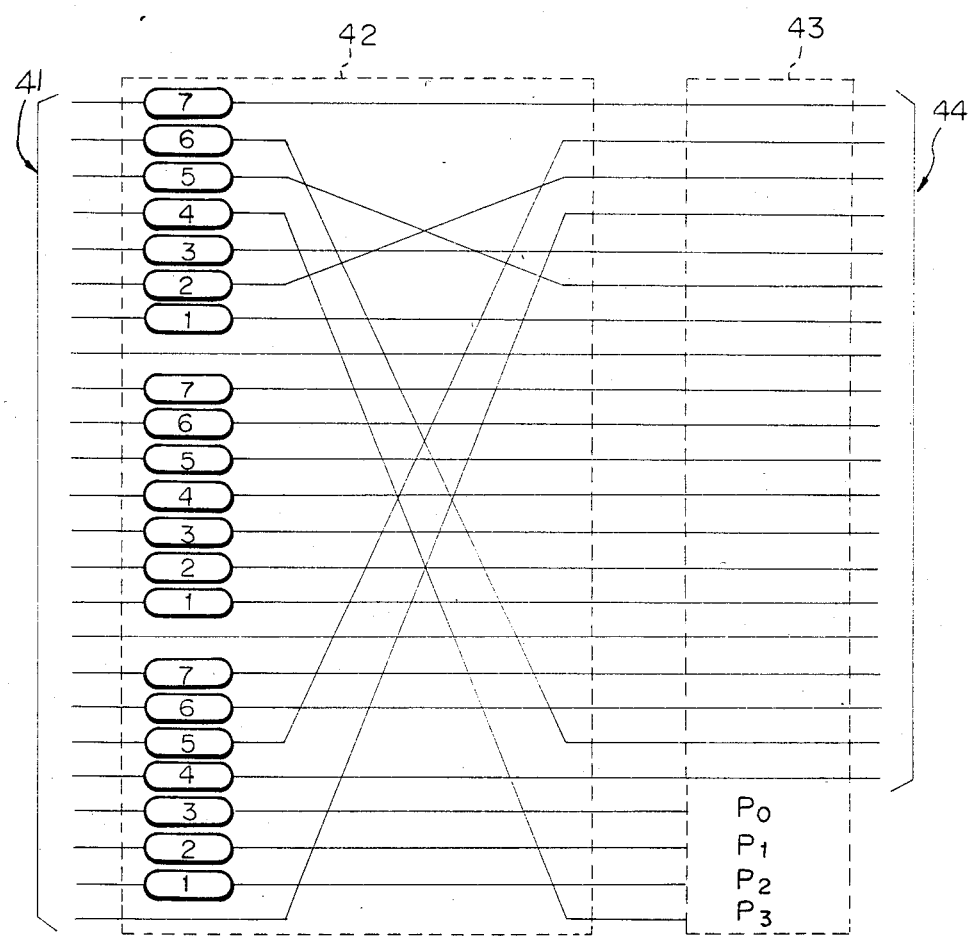
FIG. 8 is a block diagram of an embodiment of an error correction decoder for the subcoding signal to the present invention.

FIG. 8 represents error correction decoder 40, again with respect to channels R-W, in which deinterleaving circuit 42 has applied thereto 24 SYMBOLs, shown generally at 41 as one PACK of the reproduced subcoding signals. Parity or P-decoder 43 for the (24,20) Reed-Solomon code is provided with the output from deinterleaving circuit 42. It is noted that the input data 41 to the deinterleaving circuit 42 corresponds to the output data 34 from interleaving circuit 32 of FIG. 7. The deinterleave processing is performed so that data time values given by the interleaving circuit 32 are cancelled, and each SYMBOL has then the delay time values of 7 PACKs. While the decoder of FIG. 8 is shown having discrete time delay elements in each line, in fact, deinterleaving is performed by controlling the write addressing and the read addressing in a random access memory. Nevertheless, in FIG. 8, deinterleaving circuit 42 is shown in one construction in which delay elements have predetermined time delay values as represented by the numerical values shown therein and as arranged in the transmission lines of each respective SYMBOL. Delay elements of 7 PACKs are inserted into the transmission lines of the SYMBOL having the delay value of zero in the interleaving circuit 32 and similarly, delay elements of 6,5,4,3,2 and 1 PACKs are inserted respectively into the transmission lines of SYMBOLs having delay time values of 1,2,3,4,5 and 6 PACKs in interleaving circuit 32 of FIG. 7. Again, no delay element is inserted into the transmission line of the SYMBOL having the delay time value of 7 PACKs in the interleaving circuit 32.

Parity decoder 43 has a syndrome generator (not shown), to generate four error syndromes by calculating $H_p \times V_p$, wherein $H_p$ is a parity check matrix, and $V_p$ is a reproduction data matrix, in the known fashion. Checking of these four error syndromes then enables the detection of one-SYMBOL error, two-SYMBOL error and three or-more SYMBOL error, and by obtaining the error locations of the one-SYMBOL error and two-SYMBOL error, these errors can be corrected. Therefore, as the output of P-decoder 43 an error corrected output data signal 44 is obtained.

Another arrangement is possible in which a complete type interleave processing is employed, whereby the SYMBOLs in a plurality of PACKs are written into the RAM and the above-described SYMBOLs in a plurality of PACKs are then read out from the RAM using the read addresses in a sequence different from the change in the write addresses.

Figure 9:
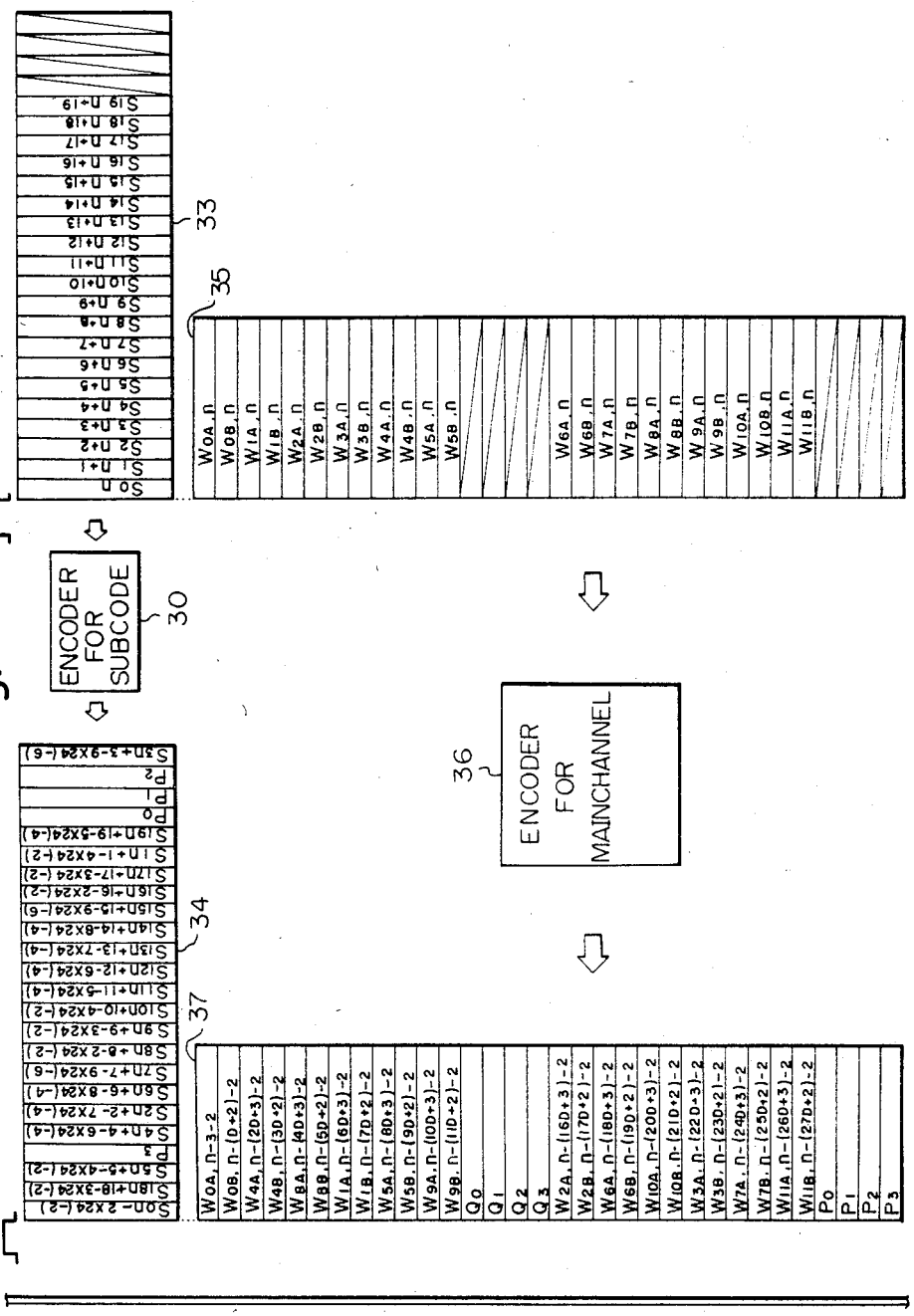
FIG. 9 is a schematic representation showing the timing relationships and contents of the subcoding signal and the data in the main channel with respect to recording processing according to the present invention.

FIG. 9 represents the timing relationship between the sub-coding signal and the main channel when recording on a master disc. Input SYMBOL 33 consisting of 20 SYMBOLs is supplied to the above-described error correction encoder 30 and a reference character SSY represents the sub-code sync representative of the timing relationship of the zero and first FRAMEs among the 98 FRAMEs, in which the sync pattern of the sub-coding signal is included. The 20 SYMBOLs in the R-W channels that are included, respectively, in the second through twenty-first FRAMEs of the 98 FRAMEs in the BLOCK following the sub-code sync signal SSY correspond to input SYMBOL 33.

This input SYMBOL 33 contains SYMBOLs that are indicated b $S_{0n}, S_{n+1}, S_{2n2}, \ldots, S_{18n+18}$ and $S_{19n+19}$. The suffixes sequentially change in increasing integers as 0,1, 2, ... 18,19, and indicate the SYMBOL number in one PACK. The suffix that sequentially changes as n,n+1, ... n+18,n+19, represents the number of the FRAME in which each SYMBOL is included. In FIG. 9, the nth FRAME in the main channel 35 indicates data $W_{0A,n}, W_{0B,n}, W_{11A,n}, \ldots W_{11A,n}, W_{11B,n}$ of 25 SYMBOLs that are included in one FRAME, that is, the nth FRAME in the main channel. Note that one SYMBOL consists of eight bits. More specifically, the input SYMBOL 33 of the sub-coding signal and the data signal 35 in the main channel shown in FIG. 9 are the data in the nth FRAME at the stage before they are encoded.

Input SYMBOL 33 is supplied to error correction encoder 30, as described hereinabove, so that output SYMBOL 34 of one PACK is generated. This output SYMBOL 34 exhibits the actual SYMBOL in the case where the interleaving circuit 32 of the error correction encoder 30 is formed by use of a random access memory and a random access memory control unit. If the interleaving circuit is comprised of a memory, then the delay time corresponding to two PACKs will be imparted because the data of one PACK is stored first in the memory and then this is read out, thereby to perform the interleave processing. The result of this is that a delay time of two PACKs is added to the delay time value as shown in FIG. 7, for example, and the SYMBOL $S_{0n-2 \times 24 \,(-2)}$ is generated from the error correction encoder 30 in response to SYMBOL $S_{0n}$ in the input signal 33.

The suffix (2) in the subscript of such SYMBOL means that the subcode sync SSY is included in two FRAMEs. This suffix number is set to (−2) for a delay time value of up to 98 SYMBOLs, is set to (−4) for a delay time value up to 196 SYMBOLs, and is set to (−6) for a delay time value of up to 294 SYMBOLs. Data 35 in the nth FRAME in the main channel is fed to encoder 36 in the min channel and the coding processing of the CIRC code is performed, in this way, output data 37 consisting of 32 SYMBOLs, which includes the parity bits $P_0$, $P_1$, $P_2$, and $P_3$ of one interleave series and the parity bits $Q_0$, $Q_1$, $Q_2$, and $Q_3$ of the other interleave series is derived as an output of encoder 36. In the embodiment of FIG. 9, each suffix relating to the respective parity bits of the subcoding signal and of the data in the main channel changes in relation to construction of the encoder, however, a description of such suffix is omitted herein because it is not necessary for an adequate description of the present invention. Output SYMBOLs 34 and 37 from the error correction encoders 30 and 36, respectively, are recorded on the compact disc, and FIG. 10 shows the timing relationship between the subcoding signal and the main channel when output SYMBOLs 34 and 37 are not recorded on the disc but are supplied directly to the reproduction signal input terminals of the reproduction circuit of the compact disc system.

Turning then to FIG. 10, the input subcoding signal is first fed to buffer memory 45 in which any time base variation is eliminated. Neglecting any time delay in buffer memory 45 in order to simplify the present explanation, input SYMBOL 41 fed to error correction decoder 40 is identical to output SYMBOL 35 of the error correction encoder 30 of FIG. 9. Input data in the main channel is fed to decoder 46 in which time base variation is eliminated and the deinterleave and error correction processing are performed, with the result that reproduction data 47 having 24 SYMBOLs is obtained at the output thereof. The reproduction of data 47 in the main channel in the same frame as SYMBOL $S_{0n-2 \times 24}$ ($-2$) is included in input symbol 41.

The subcoding signal is supplied to error corrector decoder 40 of FIG. 8 in which the deinterleaving and error correction processing is performed, so that output SYMBOL 44 is derived. As set forth hereinabove, the timing relationships of the SYMBOLs of FIGS. 9 and 10 are based upon the assumption of a system that integrates both recording and reproducing. Thus, output SYMBOLs 44 and 47, as shown in FIG. 10, represent outputs that are fed out from error correction decoders 40 and 46, respectively, when the respective inputs 33 and 35 in the nth frame are fed to the error correction encoders 30 and 36, respectively. Thus, SYMBOL $S_{0n-11 \times 24}$ ($-6$) among output SYMBOLs 44 of the subcoding signal is the SYMBOL in the $(n-270)$th FRAME. The data in the main channel in the same FRAME as this SYMBOL is that data in the $(n-115)$th FRAME, as will be obvious from its suffix, that is, $(n-3-27$ $D-4)$, when $D=4$.

As can be seen from FIGS. 9 and 10, even if both the data in the main channel and the data in the subcoding signal have been interleaved, by eliminating any time base variation, the reproduced subcoding signal and the data in the main channel have a relationship in a fixed time series and, thus, it is possible to make them correspond.

While the above description has been based upon the format of the subcoding signal of a compact disc as already known, in the case where the compact disc is used as a memory medium for digital data, a new subcoding signal suitable for such purpose could also be used. For example, the period of change of the subcoding signal could be changed from 98 FRAMEs to 22 FRAMEs.

Accordingly, by following the present invention as described above, as applied to a disc for playing back sterephonic musical signals, such as the already commerically available compact audio disc, it is possible to record digital data other than these stereophonic musical signals while maintaining consistency with respect to signal format and signal processing, such as the error correcting method and recording data format, with already commercially available compact disc systems.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. Apparatus for use in a system for reproducing a digital information signal including main digital data and subdigital data from an optical digital disc, the main digital data and subdigital data having been recorded together in a common track, comprising:

means connected to receive an information signal reproduced from said disc for generating a write clock signal synchronized therewith;

means for generating a readout clock signal having a fixed period;

first memory means connected to receive said main digital data reproduced from said disc and being connected for writing therein said main digital data in response to said write clock signal, said first memory means being connected for reading out main digital data written therein in response to said readout clock signal;

second memory means connected to write therein said subdigital data reproduced from said disc in response to said write clock signal and arranged for reading out said subdigital data written therein in response to said readout clock signal; and control means for searching a playback location of the main digital data in response to said subdigital data read out from said second memory mean.

2. Apparatus according to claim 1, in which said first memory means includes decoder means for decoding an error correction code contained in said main digital data signal.

3. Apparatus according to claim 1, in which said first memory means comprises a random access memory.

4. Apparatus according to claim 1, in which said second memory means comprises a buffer memory.

5. Apparatus according to claim 1, further comprising means for coding said subdigital data with a timing signal having values continuously changing in accordance with locations in the track on the disc.

6. Apparatus according to claim 1, further comprising demodulating means connected to receive said reproduced main digital data for demodulating a block pattern having a first number of bits to a block pattern having a second, lesser number of bits.

7. Apparatus according to claim 6, further comprising clock extraction circuit means receiving said reproduced main digital data and extracting a clock signal therefrom fed to said demodulating means.

8. Apparatus according to claim 7, further comprising a FRAME synchronization detection circuit receiving said reproduced main digital data signal and producing a FRAME sync signal fed to said demodulating means.

9. Apparatus according to claim 1, in which said control means comprises a random access memory controller operably connected to an error correction circuit for correcting time base errors and data errors in said reproduced main digital data signal.

10. Apparatus according to claim 1, further comprising a microcomputer operably connected to said control means for providing addresses corresponding to said respective playback locations.

11. Apparatus according to claim 10, in which said addresses are separated a predetermined data distance from said respective playback locations.

12. Apparatus according to claim 11, further comprising an interface unit arranged between said microcomputer and said control means.

13. Apparatus for use in reproducing digital information including main digital data and subdigital data, from an optical digital disc, in which the main digital data and the subdigital data are recorded in a common track on the disc, comprising:

- means connected to receive digital information reproduced from said disc for generating a write clock signal synchronized with the reproduction rate of the digital information;
- an oscillator for generating a readout clock signal having a fixed period;
- means for separating the main digital data and the subdigital data from the reproduced information signal;
- a random access memory connected to receive said main digital data reproduced from said disc and being connected for writing therein said main digital data in response to said write clock signal, said random access memory being connected for reading out main digital data written therein in response to said readout clock signal;
- a buffer memory connected to write therein said subdigital data reproduced from said disc in response to said write clock signal and arranged for reading out said subdigital data written therein in response to said readout clock signal; and
- control means for searching a playback location of the main digital data in response to said subdigital data read out from said buffer memory.

14. Apparatus according to claim 13, further comprising decoder means for decoding an error correction code contained in said main digital data.

15. Apparatus according to claim 13, further comprising means for coding said subdigital data with a timing signal having values continuously changing in accordance with playback locations in the track on the disc.

16. Apparatus according to claim 13, in which said means for separating said main digital data and said subdigital data comprises an EFM demodulator.

17. Apparatus according to claim 16, in which said EFM demodulator transforms a block pattern having a first number of bits to a block pattern having a second lesser number of bits.

18. Apparatus according to claim 17, further comprising clock extraction circuit means receiving said reproduced main digital data and extracting a clock signal therefrom fed to said EFM demodulator.

19. Apparatus according to claim 18, further comprising a FRAME synchronization detection circuit receiving said reproduced main digital data signal and producing a FRAME sync signal fed to said EFM demodulator.

* * * * *